(12) United States Patent
Fischer et al.

(10) Patent No.: US 11,957,095 B2
(45) Date of Patent: Apr. 16, 2024

(54) MODULAR LANDSCAPE BORDER SYSTEM

(71) Applicants: Stanley Fischer, Evansville, IN (US); Angela Fischer, Evansville, IN (US)

(72) Inventors: Stanley Fischer, Evansville, IN (US); Angela Fischer, Evansville, IN (US)

(*) Notice: Subject to any disclaimer, the term of this patent is extended or adjusted under 35 U.S.C. 154(b) by 0 days.

(21) Appl. No.: 17/072,296

(22) Filed: Oct. 16, 2020

(65) Prior Publication Data

US 2021/0112731 A1 Apr. 22, 2021

Related U.S. Application Data

(60) Provisional application No. 62/923,696, filed on Oct. 21, 2019.

(51) Int. Cl.
*A01G 9/28* (2018.01)
(52) U.S. Cl.
CPC ...................... *A01G 9/28* (2018.02)
(58) Field of Classification Search
CPC ................. A01G 9/28; Y10T 403/50
See application file for complete search history.

(56) References Cited

U.S. PATENT DOCUMENTS

| | | | |
|---|---|---|---|
| 5,092,076 A | 3/1992 | Terreta | |
| 5,901,526 A * | 5/1999 | Vidmar | E04H 12/2215 47/33 |
| 6,026,610 A * | 2/2000 | Northrop | A01G 9/28 47/33 |
| 6,085,458 A | 7/2000 | Gau | |
| 6,202,367 B1 * | 3/2001 | Marino | A01G 9/28 47/33 |
| 6,591,547 B1 * | 7/2003 | Staten | A01G 9/28 47/33 |
| 8,808,600 B1 * | 8/2014 | Christensen | F16B 21/12 264/328.8 |
| 9,109,337 B2 | 8/2015 | Wink | |
| 9,313,956 B2 | 4/2016 | Volin | |
| 9,363,948 B2 * | 6/2016 | Birkland | A01G 9/28 |
| 9,974,240 B1 * | 5/2018 | Brinner | A01G 9/28 |
| 9,993,074 B1 * | 6/2018 | Osecki | A47B 47/00 |
| 10,060,081 B2 * | 8/2018 | Alfieri, III | A01G 9/28 |

(Continued)

FOREIGN PATENT DOCUMENTS

| | | | | |
|---|---|---|---|---|
| GB | 2396165 A * | 6/2004 | | E04H 17/16 |
| WO | WO-2011098678 A1 * | 8/2011 | | E04C 2/06 |

*Primary Examiner* — Brady W Frazier
*Assistant Examiner* — Katherine Anne Kloecker
(74) *Attorney, Agent, or Firm* — Boudwin Intellectual Property Law, LLC; Daniel Boudwin (57) ABSTRACT

A modular landscape border system is provided. The modular landscape border system includes a plurality of elongated members having a vertical protrusion extending along opposing lateral sides thereof. The system further includes a connector having a track within each of a first side and a second side thereof, wherein the track is dimensioned to receive the vertical protrusion therethrough. A channel extends through the connector between an upper side thereof and a lower side thereof. The channel is dimensioned to receive a securement spike therethrough, wherein the securement spike is a greater length than a height of the connector, such that a working end of the securement spike engages a ground surface when disposed through the channel.

2 Claims, 6 Drawing Sheets

(56) References Cited

U.S. PATENT DOCUMENTS

| | | |
|---|---|---|
| 10,612,207 B1 * | 4/2020 | Jordan, IV .......... E02D 29/0266 |
| 2005/0050823 A1 * | 3/2005 | Whitson ................... B44C 5/00 |
| | | 52/311.1 |
| 2008/0104896 A1 | 5/2008 | Strobl et al. |
| 2010/0186293 A1 | 7/2010 | Flynn |
| 2014/0130411 A1 * | 5/2014 | Topping .................. A01G 9/28 |
| | | 47/66.1 |
| 2019/0133053 A1 * | 5/2019 | Dervin-Stathes ....... F16C 11/12 |

\* cited by examiner

MODULAR LANDSCAPE BORDER SYSTEM

CROSS REFERENCE TO RELATED APPLICATIONS

This application claims the benefit of U.S. Provisional Application No. 62/923,696 filed on Oct. 21, 2019. The above identified patent application is herein incorporated by reference in its entirety to provide continuity of disclosure.

BACKGROUND OF THE INVENTION

The present invention relates to landscape edging and bordering systems. More particularly, the present invention pertains to a modular landscape border system having one or more connectors allowing a user to selectively connect a plurality of border segments to conform to a desired shape of a landscaping bed.

Many individuals enjoy gardening or maintaining well-manicured and landscaped yards. Typically, this involves clearly delineating the lawn from landscaping beds with various foliage. Ideally, these landscaped beds are defined by crisp edges clearly distinguishing the bed from the remainder of the lawn. However, keeping the landscaped areas separate from the rest of the lawn can be a significant challenge. Grass clippings may cross over into the landscaped area, or alternatively, mulch or other landscaping materials may spread onto the lawn. Remedying this can be a time-consuming and difficult task.

Traditionally, landscape border systems are employed to provide a crisp line between the landscaped area and the lawn while also providing a physical barrier to aid in preventing cross-contamination between the two areas, such as caused by weather blowing contents from one area to another. These borders can be effective, however, most such systems are not readily customizable and must be manually cut or altered to fit a desired landscaping bed shape. Additionally, many existing systems are unable to conform to a variety of bed shapes. Therefore, a modular landscape border system capable of being assembled to conform to a variety of landscaping bed shapes is desired.

In light of the devices disclosed in the known art, it is submitted that the present invention substantially diverges in design elements from the known art and consequently it is clear that there is a need in the art for an improvement to existing landscape edging systems. In this regard, the instant invention substantially fulfills these needs.

SUMMARY OF THE INVENTION

In view of the foregoing disadvantages inherent in the known types of landscape bordering systems now present in the known art, the present invention provides a modular landscape border system wherein the same can be utilized for providing convenience for the user when conforming the landscape border to a variety of bed shapes and sizes.

The present system comprises a plurality of elongated members having a vertical protrusion extending along opposing lateral sides thereof. The system further comprises a connector having a track within each of a first side and a second side thereof, wherein the track is dimensioned to receive the vertical protrusion therethrough. A channel extends through the connector between an upper side thereof and a lower side thereof. The channel is dimensioned to receive a securement spike therethrough. The securement spike comprises a length greater than a height of the connector, such that a working end of the securement spike engages a ground surface when disposed through the channel. In some embodiments, the system further comprises a second connector having a first portion and a second portion defining a hinge therebetween. The second connector similarly includes tracks opposite the hinge, such that the elongated members secured thereto are pivotally movable about the hinge.

In another embodiment, the connector comprises a first portion and a second portion pivotally affixed about a hinge. In other embodiments, the hinge is defined by a pair of eyelets extending from an upper end and a lower end of the first portion, and an annular member affixed to the second portion, wherein the channel extends through each of the pair of eyelets and the annular member. In other embodiments, the vertical protrusion comprises a cylindrical distal end. In yet another embodiment, the upper side of the connector rests flush with an upper edge of the plurality of elongated members when secured thereto. In some embodiments, a lip extends bilaterally from an upper edge of the plurality of elongated members. In another embodiment, a head of the securement spike comprises a diameter greater than that of the channel. In other embodiments, the plurality of elongated members comprises a flexible member. In yet another embodiment, the plurality of elongated members comprises an arcuate form factor.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the modular landscape border system. The figures are intended for representative purposes only and should not be considered to be limiting in any respect.

Figure 1A:
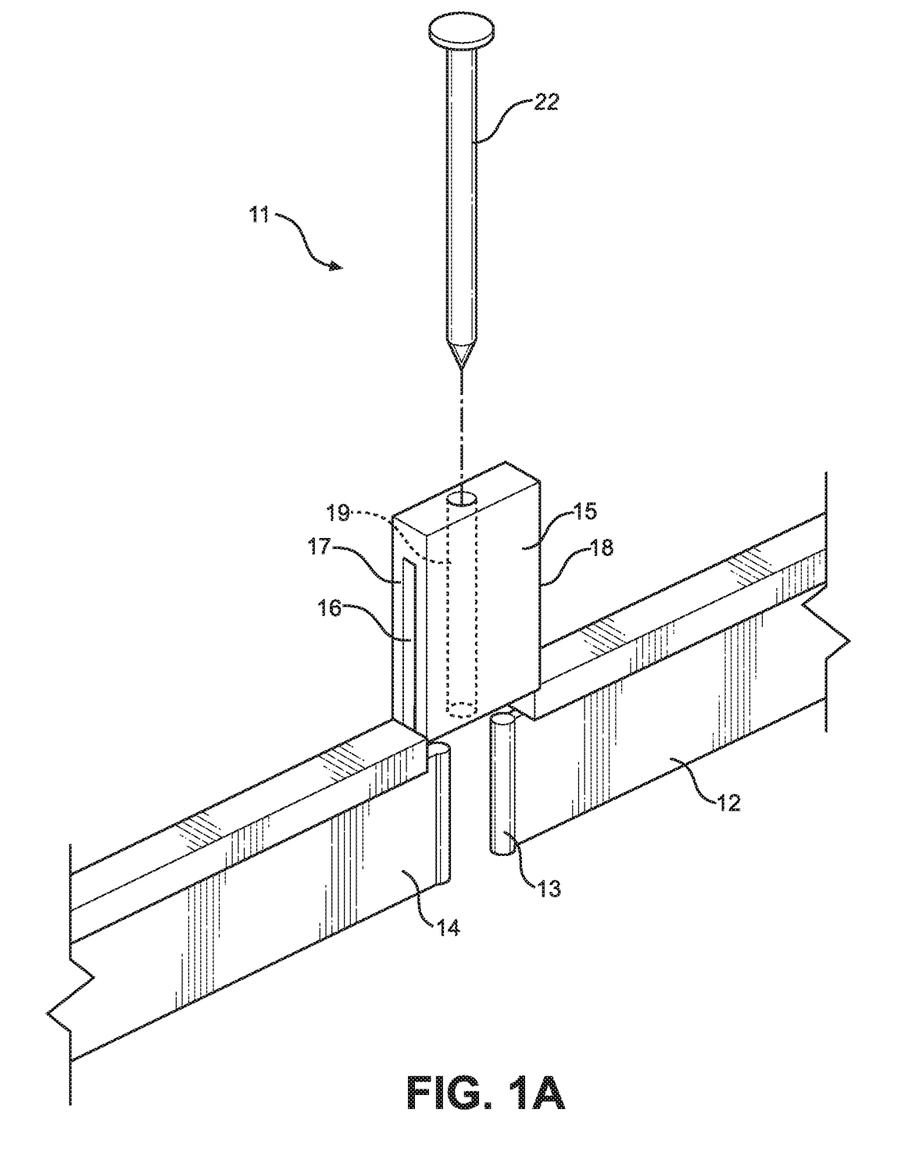
FIG. 1A shows an exploded view of an embodiment of the modular landscape border system with a rigid connector.
Figure 1B:
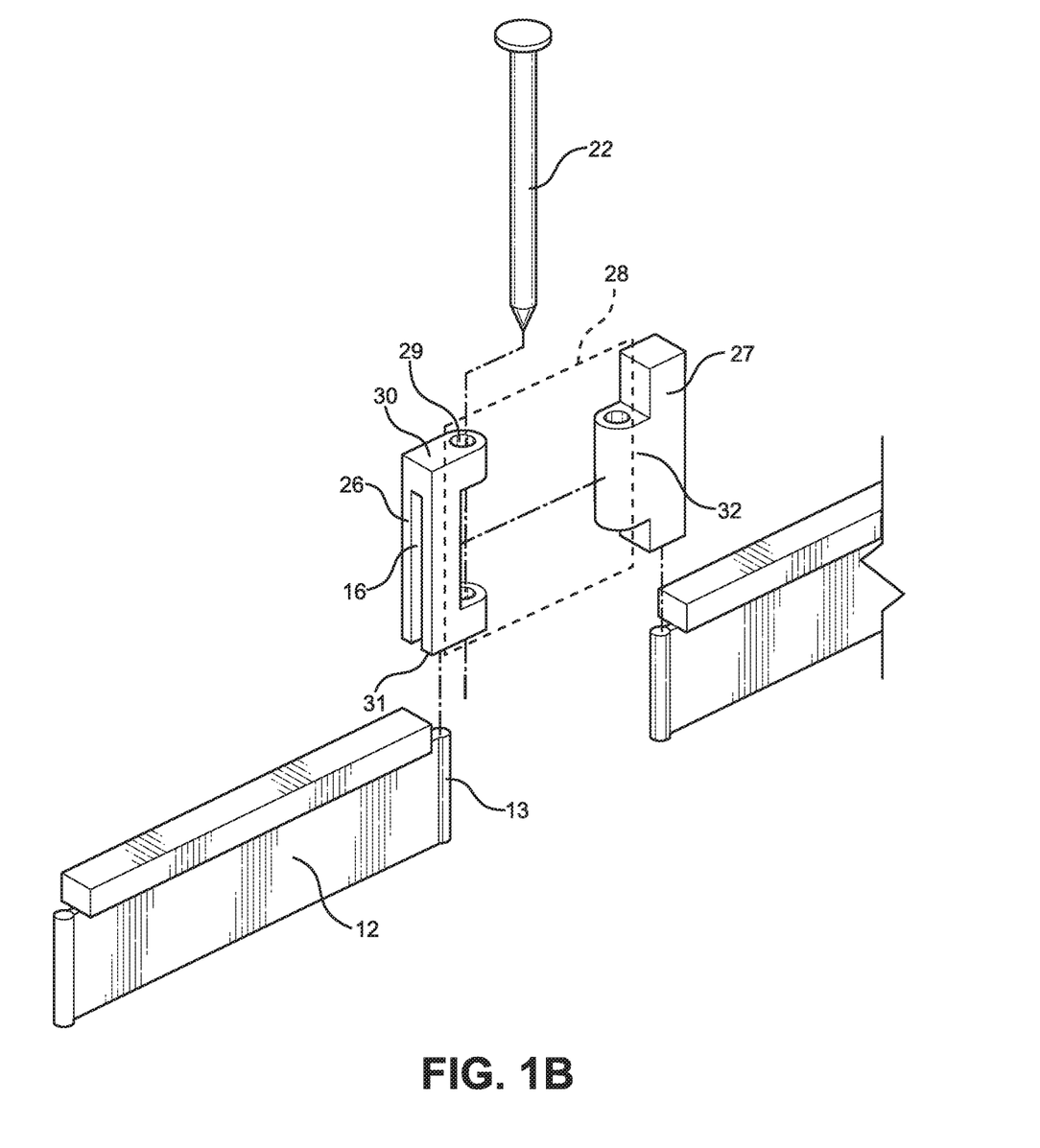
FIG. 1B shows an exploded view of an embodiment of the modular landscape border system with a hinged connector.

Referring now to FIGS. 1A and 1B, there is shown an exploded view of an embodiment of the modular landscape border system with a rigid connector and an exploded view of an embodiment of the modular landscape border system with a hinged connector, respectively. The modular landscape border system 11 comprises a plurality of elongated members 12, wherein each elongated member 12 includes a vertical protrusion 13 extending from opposing lateral sides 14 thereof. The plurality of elongated members 12 are removably securable to each other via a connector 15 to define a landscape border to separate a landscaping bed from a surrounding lawn, paving, or other ground surface. In the illustrated embodiments, the elongated members 12 comprise a substantially planar structure dimensioned to be easily inserted into a ground surface to divide and separate landscaping beds. In the shown embodiment, the elongated members 12 comprise a linear shape, however, in alternate embodiments, the elongated members 12 comprise an arcuate form factor to conform to a variety of landscaping bed shapes and sizes. Similarly, in another embodiment, the elongated members 12 are contemplated to be flexible, thereby allowing a user to bend the elongated members 12 into a desired shape without breaking or weakening the material to define the landscaping bed border.

Figure 3A:
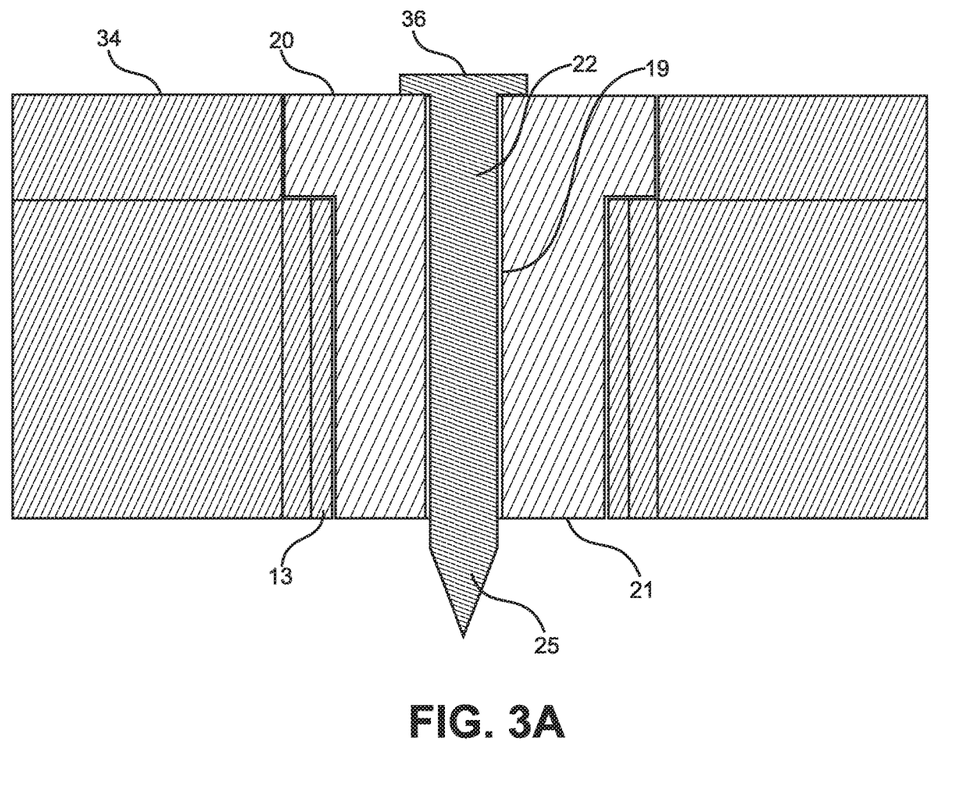
FIG. 3A shows a cross-sectional view of an embodiment of the modular landscape border system with a rigid connector.

In the illustrated embodiment of FIG. 1A, the connector 15 comprises a rigid structure having a track 16 disposed along each of a first side 17 and a second side 18 thereof. The track 16 is dimensioned to receive the vertical protrusion 13 therein, such that the connector 15 is secured to a pair of elongated members 12. In the shown embodiment, the track 16 extends along a majority of the connector 15 beginning from a lower side (as shown in FIG. 3A, 21) thereof, such that an upper side (as shown in FIG. 3A, 20) of the connector 15 remains closed. In this manner, the vertical protrusion 13 is retained within the track 16 during use. A channel 19 extends through an entirety of the connector 15, wherein the channel 19 is dimensioned to receive a securement spike 22 therethrough. In the shown embodiment, the channel 19 is centrally disposed through the connector 15 such that forces are evenly distrusted through the connector 15 to each of the plurality of elongated members 12. Additionally, the central placement of the channel 19 prevents the channel 19 from interfering with the operation of the tracks 16 disposed within the connector 15. The securement spike 22 is contemplated to comprise a length greater than that of the connector 15, such that a working end (as shown in FIG. 3A, 25) of the securement spike 22 extends therethrough to engage a ground surface. In this manner, the securement spike 22 further secures the modular landscaping border system 11 about a landscaping bed.

In the illustrated embodiment of FIG. 1B, the connector comprises a first portion 26 and a second portion 27 pivotally affixed together about a hinge 28. Each of the first portion 26 and the second portion 27 comprise a track 16 opposite the hinge 28, such that the track 16 is removably securable to the vertical protrusion 13 of each of the plurality of elongated members 12. In the shown embodiment, the hinge 28 is defined by a pair of eyelets 29 extending from each of an upper end 30 of the first portion 26 and a lower end 31 of the first portion 26 and an annular barrel 32 extending centrally from the second portion 27. A height of the annular barrel 32 is dimensioned to secure between the pair of eyelets 29, such that the channel 19 is defined through the pair of eyelets 29 and the annular barrel 32 when coaxially aligned. The channel 19 is dimensioned to receive the securement spike 22 therethrough. In this manner, when the securement spike 22 is inserted through the channel 19, the first portion 26 and the second portion 27 are pivotable about the hinge 28. This allows a user to adjust an angle between adjacent elongated members 12, such that the user can adjust the modular landscape border system 11 to a desired shape to conform to a landscaping bed.

Figure 2:
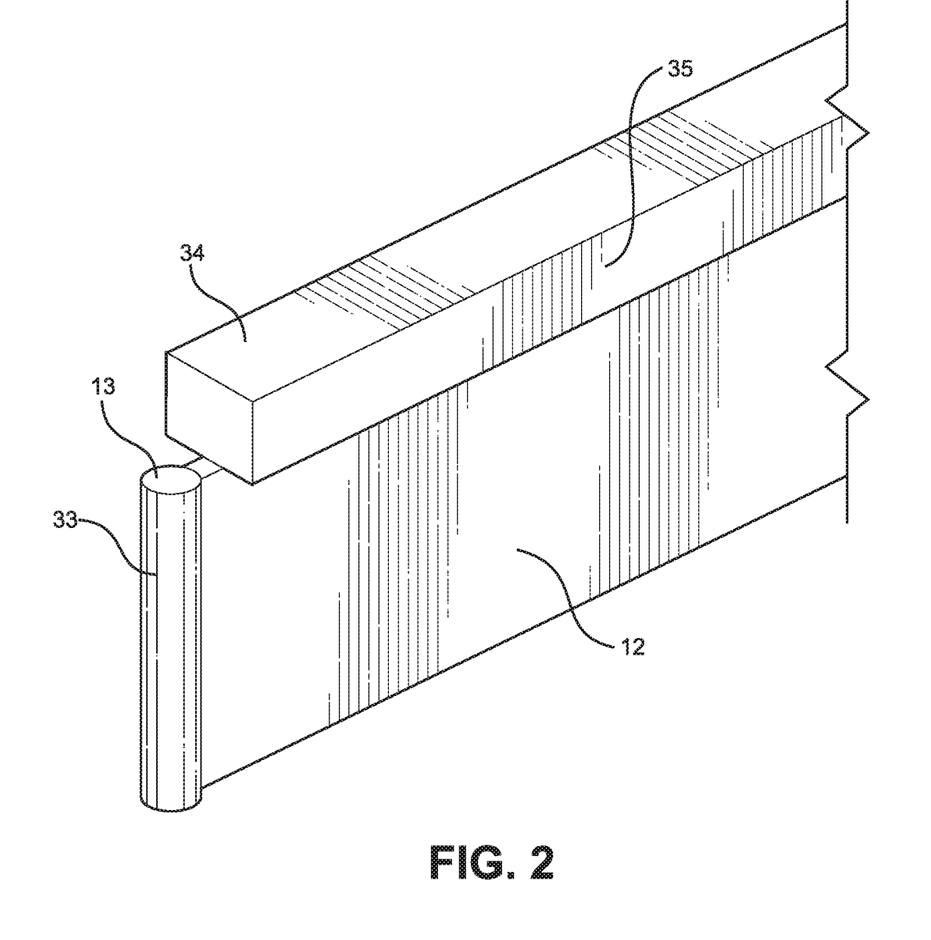
FIG. 2 shows a close-up view of an end of an elongated member of an embodiment of the modular landscape border system.

Referring now to FIG. 2, there is shown a close-up view of the end of an elongated member of an embodiment of the modular landscape border system. In the illustrated embodiment, a distal end 33 of the vertical protrusion 13 comprise a greater width than a proximal end thereof. Consequently, the track is dimensioned to mimic the structure of the vertical protrusion. As such, an entrance to the track comprises a narrower opening along the first and second sides of the connector to prevent the distal end 33 from exiting through the opening. In this manner, the elongated member 12 cannot be removed from the connector via application of perpendicular forces, thereby ensuring the elongated members 12 remain connected as desired. In the shown embodiment, the distal end 33 comprises a cylindrical cross-section.

In the shown embodiment, an upper edge 34 of the elongated member 12 comprises a lip 35 extending bilaterally therefrom along a length of the elongated member 12. The lip 35 defines a greater width than a remainder of the elongated member 12, such that the lip 35 prevents the elongated member 12 from penetrating entirely within a ground surface. In some embodiments, the upper edge 34 is textured to replicate a desired aesthetic border, such as cobblestone, brick, or the like. In this manner, the user can increase the aesthetic appeal of the landscaping border, incorporating the textured element into the landscaping design. Additionally, the lip 35 provides the user a gripping surface allowing the user to apply pressure across a wider cross-sectional area to drive the elongated member 12 into a ground surface. In this manner, the pressure applied to a user's hand is reduced, thereby minimizing discomfort or risk of injury during placement within a ground surface.

Figure 3B:
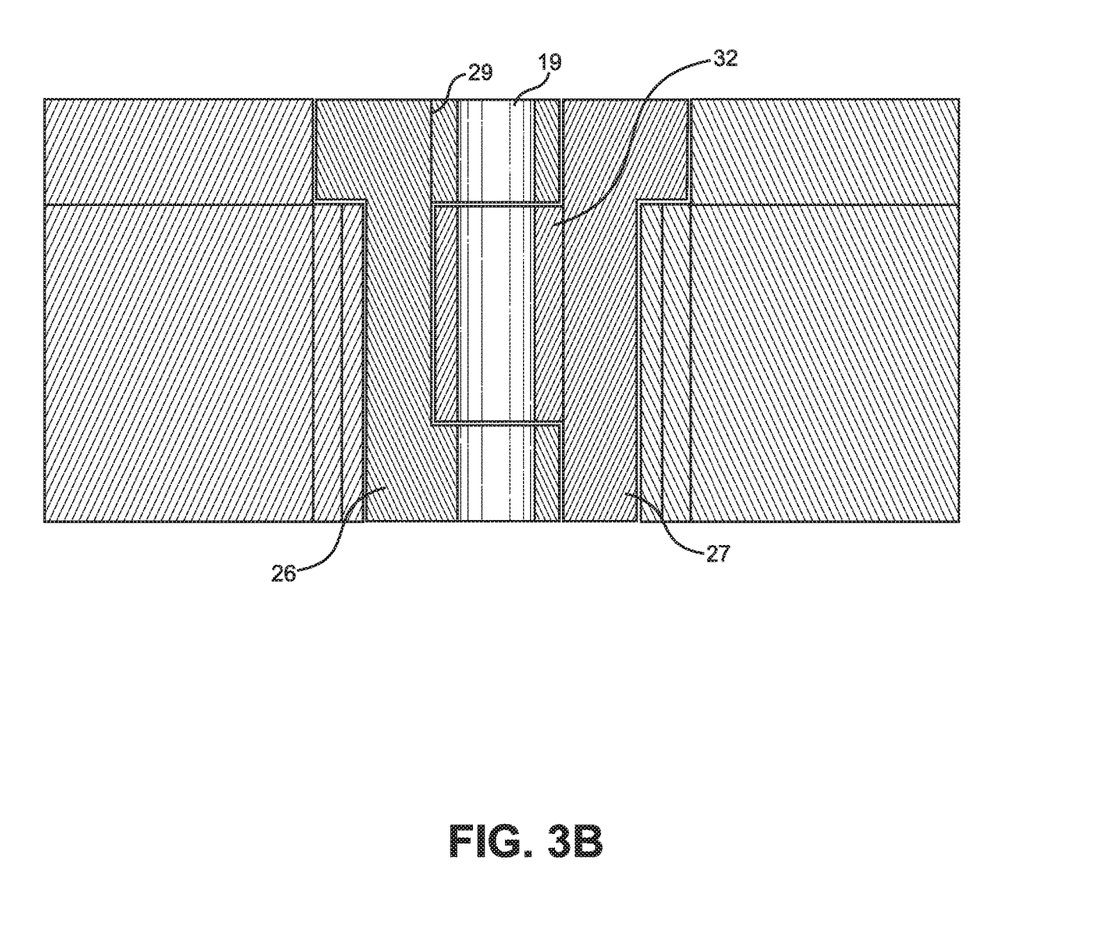
FIG. 3B shows a cross-sectional view of an embodiment of the modular landscape border system with a hinged connector.

Referring now to FIGS. 3A and 3B, there is shown a cross-sectional view of an embodiment of the modular landscape border system with a rigid connector and a cross-sectional view of an embodiment of the modular landscape border system with a hinged connector, respectively. In the illustrated embodiment, the track extends along the first and second sides of the connector from a lower side 21 thereof, wherein the track terminates before reaching an upper side 20 of the connector. In this manner, the vertical protrusion 13 is retained within the track while the border system is inserted into a ground surface. In the shown embodiment, the track comprises a height equivalent to that of the vertical protrusion 13. Furthermore, in the illustrated embodiment, when the connector is secured to the pair of elongated members, the upper edge 34 of the elongated member is disposed flush with the upper side 20 of the connector. In this manner, the point of connection between the elongated members and the connector is disguised, allowing the modular landscaping border system to appear continuous along an entire length thereof.

As shown in the illustrated embodiment, the channel 19 extends through an entirety of the connector between the upper side 20 and the lower side 21, allowing a securement spike 22 to be inserted therethrough. In the embodiment shown in FIG. 3B, the channel 19 is defined upon coaxial alignment of the pair of eyelets 29 and the annular barrel 32 of the first and second portions 26, 27 of the connector, respectively, thereby defining a hinge. The securement spike 22 comprises a length greater than a height of the connector such that a working end 25 of the spike extends through the lower side 21 of the connector. In this manner, the working end 25 can pierce into a ground surface to engage the landscape border system to the ground surface. In the shown embodiment, the working end 25 tapers to a point, thereby decreasing the force required to engage the securement spike 22 with the ground surface. Additionally, in the illustrated embodiment, a head 36 of the securement spike 22 comprises a diameter greater than that of the channel 19. In this manner, the head 36 acts as a stopper preventing the securement spike 22 from being inserted entirely through the channel 19. Furthermore, the head 36 provides a gripping surface allowing a user to easily remove the securement spike 22 from the channel 19 as desired. In the shown embodiment, when the securement spike 22 is inserted through the channel 19, the head 36 rests flush against the upper side 20 of the connector to reduce form factor.

Figure 4:
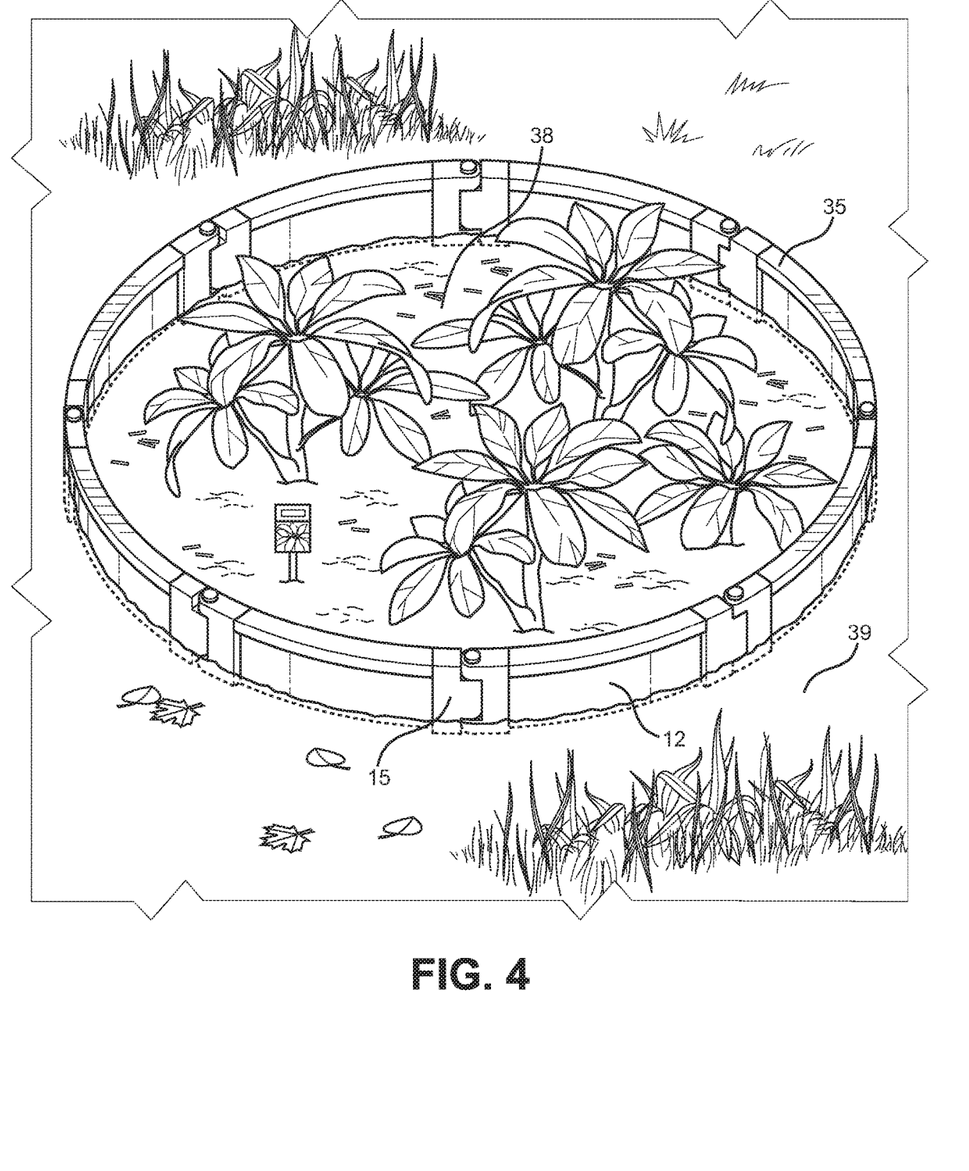
FIG. 4 shows a perspective view of an embodiment of the modular landscape border system in use.

Referring now to FIG. 4, there is shown a perspective view of an embodiment of the modular landscape border system in use. In one use, the user assembles the modular landscape border system in a desired shape to separate a landscaping bed 38 from the surrounding area 39. In the illustrated embodiment, the modular landscaping border system is assembled in a circular fashion utilizing a plurality of hinged connectors 15 and arcuate elongated members 12. However, it should be noted that any combination of linear, arcuate, or flexible elongated members 12 can be combined utilizing both rigid and hinged connectors 15 to assemble a landscaping border system for a desired bed shape. The landscaping border system can then be inserted into a ground surface via application of pressure along the upper edge thereof. In the shown embodiment, the modular landscaping border system is partially inserted into the ground surface about a desired landscaping bed 38. While some uses contemplate partially inserting the elongated members 12 into the ground surface to provide a physical barrier between landscaping beds 38 and debris from the surrounding area 39, it should be understood that the modular landscaping border system can be inserted to greater or lesser depths as desired by the user. For example, the elongated members 12 can be inserted until an underside of the lip 35 rests flush against the ground surface to minimize visibility of the landscaping border system while providing a clean border around the landscaping bed 38. In such embodiments, the lip 35 may include texturing thereon to replicate paving stones, brick, cobblestone, or other materials to provide an aesthetically pleasing delineation between the landscaping bed 38 and the surrounding area 39.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A modular landscape border system, consisting of:
 a plurality of elongated members having a vertical protrusion extending along each opposing lateral side thereof;
 wherein a length of each of the plurality of elongated members defined between the opposing lateral sides thereof is greater than a height of the plurality of elongated members;
 wherein the vertical protrusion comprises a proximal end affixed to each lateral side of the plurality of elongated members opposite a free distal end; and
 wherein the distal end comprises a greater width than the proximal end;
 a connector having a track within each of a first side and a second side of the connector;
 wherein the track is dimensioned to receive the vertical protrusion therethrough;
 wherein the track extends along a majority of a height of each of the first side and the second side such that the track comprises an open lower end opposite a closed upper end; and
 wherein the connector comprises a first portion and a second portion pivotally affixed together about a hinge;
 a channel extending through the connector between an upper side thereof and a lower side thereof;
 wherein the channel is dimensioned to receive a securement spike therethrough;
 wherein the securement spike comprises a length greater than a height of the connector, such that a working end of the securement spike engages a ground surface when disposed through the channel;
 wherein the vertical protrusion comprises a cylindrical distal end that comprises a cylindrical cross-section;
 wherein the hinge is defined by a pair of eyelets extending from an upper end of the first portion and a lower end of the first portion and an annular member affixed to the second portion; and
 wherein the channel extends through each of the pair of eyelets and the annular member;
 wherein the upper side of the connector rests flush with an upper edge of each elongated member of the plurality of elongated members when secured thereto;
 wherein a lip extends bilaterally from an upper edge of the plurality of elongated members;
 wherein a head of the securement spike comprises a diameter greater than that of the channel, such that a lower surface of the head rests flush against the upper side of the connector when the securement spike is inserted through the channel;
 wherein the plurality of elongated members comprise a flexible material; and
 wherein the plurality of elongated members are arcuate.

2. A modular landscape border system, comprising consisting of:
 a plurality of elongated members having a vertical protrusion extending along opposing lateral sides thereof;
 wherein a length of each of the plurality of elongated members defined between the opposing lateral sides thereof is greater than a height of each of the plurality of elongated members;
 wherein the vertical protrusion comprises a proximal end affixed to each lateral side of the plurality of elongated members opposite a free distal end;
 wherein the distal end comprises a greater width than the proximal end;
 a rigid first connector having a track within each of a first side and a second side thereof;
 wherein the track is dimensioned to receive the vertical protrusion therethrough;
 wherein the track extends along a majority of a height of each of the first side and the second side such that the track comprises an open lower end opposite a closed upper end;
 a channel extending through the first connector between an upper side thereof and a lower side thereof;

a second connector having a first portion and a second portion defining a hinge there between;

wherein a track dimensioned to receive the vertical protrusion therethrough is disposed in each of the first portion and the second portion opposite the hinge;

wherein the track extends along a majority of a height of each of the first portion and the second portion such that the track comprises an open lower end opposite a closed upper end;

wherein the channel is dimensioned to receive a securement spike therethrough;

wherein the securement spike comprises a length greater than a height of the connector, such that a working end of the securement spike engages a ground surface when disposed through the channel;

wherein the vertical protrusion comprises a cylindrical distal end that comprises a cylindrical cross-section;

wherein the hinge is defined by a pair of eyelets extending from an upper end of the first portion and a lower end of the first portion and an annular member affixed to the second portion and wherein the channel extends through each of the pair of eyelets and the annular member;

wherein a lip extends bilaterally from an upper edge of the plurality of elongated members;

wherein a head of the securement spike comprises a diameter greater than that of the channel, such that a lower surface of the head rests flush against the upper side of each connector when the securement spike is inserted through the channel;

wherein the plurality of elongated members comprise a flexible material;

wherein the plurality of elongated members are arcuate;

wherein an upper edge of each of the plurality of elongated members is textured to replicate a border material; and wherein the pair of eyelets and the annular member each comprise an arcuate distal end that interfaces with a planar interior surface of each of the first and second portions.

* * * * *